United States Patent
Schmitt

(10) Patent No.: US 6,827,872 B2
(45) Date of Patent: Dec. 7, 2004

(54) PROCEDURE FOR REMOVING A WATER-INSOLUBLE FINISH FROM ARAMIDE FIBERS

(75) Inventor: Michael H. Schmitt, Düsseldorf (DE)

(73) Assignee: Teijin Twaron GmbH, Wuppertal (DE)

( * ) Notice: Subject to any disclaimer, the term of this patent is extended or adjusted under 35 U.S.C. 154(b) by 0 days.

(21) Appl. No.: 10/058,398

(22) Filed: Jan. 30, 2002

(65) Prior Publication Data

US 2002/0124325 A1 Sep. 12, 2002

(30) Foreign Application Priority Data

Feb. 1, 2001 (EP) .............................. 01102295

(51) Int. Cl.⁷ .................... D06M 15/00; D06M 13/203; D06P 5/00
(52) U.S. Cl. ............... 252/8.61; 8/193; 8/194; 8/115.51; 525/134; 525/139; 428/395
(58) Field of Search ............ 252/8.61; 8/193, 8/194, 115.51; 525/134, 139; 428/395

(56) References Cited

U.S. PATENT DOCUMENTS

| | | | | | |
|---|---|---|---|---|---|
| 4,759,770 | A | * | 7/1988 | Cates et al. .................... | 8/490 |
| 5,096,459 | A | * | 3/1992 | Ghorashi ....................... | 8/584 |
| 5,118,430 | A | * | 6/1992 | Rebouillat et al. .......... | 428/395 |
| 5,855,623 | A | * | 1/1999 | English et al. ............. | 8/115.56 |

FOREIGN PATENT DOCUMENTS

| | | |
|---|---|---|
| JP | A 59106570 | 6/1984 |
| JP | A 04202853 | 7/1992 |
| JP | A 06235163 | 8/1994 |
| JP | A 07286061 | 10/1995 |

* cited by examiner

*Primary Examiner*—Margaret Einsmann
*Assistant Examiner*—Preeeti Kumar
(74) *Attorney, Agent, or Firm*—Oliff & Berridge, PLC

(57) ABSTRACT

A procedure for removing a water-insoluble finish from aramide fibers, wherein the aramide fibers are present as short-cut, random fibers or flat textile materials and are treated with an agent that contains at least one hydrophilic fluid.

36 Claims, No Drawings

PROCEDURE FOR REMOVING A WATER-INSOLUBLE FINISH FROM ARAMIDE FIBERS

BACKGROUND OF THE INVENTION

1. Field of Invention

This invention relates to a procedure for removing a water-insoluble finish from aramide fibers.

2. Description of Related Art

Aramide fibers are expensive in comparison to other synthetic fibers. Therefore, it is worthwhile to recycle the fibers following their use. The aramide fibers are often provided with a water-insoluble finish, e.g., with a cross-linked water-blocking finish or a water-repellant finish. Cross-linked water-blocking finishes are known to comprise compounds that only swell in contact with water. Water-repellant finishes are known to consist of compounds that repel water. Therefore, if the aramide fibers are provided with a cross-linked water-blocking or water-repellant finish, the fibers only become accessible for recycling after the mentioned finish has been removed.

JP-A-59 106 570 proposes that the fibers be treated in a low-temperature plasma to remove the water-repellant finish from textiles. However, this procedure is expensive in light of the vacuum equipment required for this purpose.

One disclosure of JP-A-04 202 853 for removing the water-repellant finish from aramide fibers involves treating the fibers through mechanical abrading with a spiked lattice or emery paper, but preferably with sandblasting. However, the danger with these procedures is that the aramide fiber becomes damaged. Another disclosure in JP-A-04 202 853 teaches eluting with a solvent, but provides no indication as to the type of solvent. Therefore, the expert must first figure out which water-repellant finish was used on the aramide fibers. Then, the expert must find a solvent in which this water-repellant finish is soluble, and finally, this solvent must not dissolve the aramide fibers.

Therefore, an object of this invention is to provide a procedure for removing a cross-linked water-blocking or water-repellant finish from aramide fibers that is easy to execute and does not damage the aramide fibers.

SUMMARY OF THE INVENTION

These and other subjects are achieved by a procedure for removing a water-insoluble finish from aramide fibers wherein the aramide fibers are present as a short-cut, random fiber or flat textile material, and treated with an agent that comprises at least one hydrophilic fluid. In this case, the term hydrophilic fluid refers to a hydrophilic liquid or hydrophilic gas within the framework of this invention. Further, being treated within the framework of this invention implies that the aramide fibers are treated once or repeatedly with the agent containing at least one hydrophilic fluid.

The procedure according to the invention removes the water-insoluble finish from the aramide fibers to at least the extent that the fibers treated according to the invention can be recycled.

DETAILED DESCRIPTION OF PREFERRED EMBODIMENTS

The fact that a water-insoluble finish is removed from aramide fibers with precisely a hydrophilic fluid comes as a surprise, since one known characteristic of water-insoluble finishes, in particular, is that they are resistant to dissolution by a hydrophilic fluid.

In a preferred embodiment of the procedure of the invention, the water-insoluble finish of the aramide fibers is a cross-linked water-blocking finish, e.g., an acrylamine, acrylamide, sodium acrylate or dialkylaminoethylmethacrylate made insoluble through ionic and/or covalent cross-linking, or a cross-linked polyacrylic acid or cross-linked copolymer that comprises monomers containing acrylamide, carboxyl groups and sulfo groups, e.g., a cross-linked terpolymer partially neutralized with NaOH, which is composed of the monomers acrylic acid, sodium acrylate, acrylamide and the sodium salt of vinyl sulfonic acid, and available from the company Stockhausen under the name Intrasol AFW.

In another preferred embodiment of the procedure of the invention, the water-insoluble finish of the aramide fibers is a water-repellant finish, e.g., a fluorine-carbon compound, as used for impregnating flat textile materials, e.g., fabrics.

Fibers from all known aromatic polyamides can be used as aramide fibers in the procedure according to the invention, wherein the aramide fibers preferably consist of m-aramide, e.g., TECHNORA® from Teijin, or of p-aramide, e.g., TWARON® from Twaron Products.

Basically any hydrophilic fluid can be used as the hydrophilic fluid in the procedure of the invention, as long as it does not dissolve the aramide fibers, e.g., those hydrophilic solvents that do not dissolve aramide fibers.

Water is preferably used as the hydrophilic fluid in the procedure of the invention, wherein the water-insoluble finish is already removed with water at room temperature. In the procedure of the invention, the water preferably has a temperature ranging from about 60 to about 120° C., more preferably from about 85 to about 110° C., and in particular, a temperature of about 100° C. The higher the temperature selected, the faster the finish is removed, and less, if any, foam is produced, e.g., when working with water heated to about 100° C. At temperatures where foaming is a disruption, e.g., at room temperature, a defoamer can be used.

Another preferred hydrophilic fluid of the procedure of the invention is dimethyl sulfoxide or a solution of dimethyl sulfoxide in water, wherein the concentration of dimethyl sulfoxide in water preferably ranges from about 30 to 100% w/w, more preferably from about 70 to 100% w/w.

The water-insoluble finish is removed with dimethyl sulfoxide or its aqueous solution already at room temperature, but the temperature of the dimethyl sulfoxide or its aqueous solution preferably ranges from about 20 to about 140° C., more preferably from about 70 to about 110° C. since this shortens the treatment time.

Further, an aqueous solution of an aliphatic cyclic ester with 2 to 4 alkylene groups is preferably used as the hydrophilic fluid in the procedure of the invention, wherein $\chi$-butyrolactone is especially preferred as the aliphatic cyclic ester.

In the procedure of the invention, the concentration of aliphatic cyclic ester in water preferably measures from about 30 to about 80% w/w, more preferably from about 50 to about 70% w/w.

The water-insoluble finish is removed using an aqueous solution of an aliphatic cyclic ester with 2 to 4 alkylene groups already at room temperature. The temperature of the aqueous solution of the aliphatic cyclic ester with 2 to 4 alkylene groups preferably measures from about 20 to about 90° C., more preferably from about 60 to about 90° C. since this shortens the treatment time.

In addition, an aqueous solution of at least one aliphatic alcohol with 1 to 5 carbon atoms is preferably used as the hydrophilic fluid in the procedure according to the invention. It is especially preferred that the aliphatic alcohol be methanol, ethanol, 1-propanol, isopropyl alcohol, 1-butanol, isobutyl alcohol, 2-butanol, tert-butanol, 1-pentanol, 2-pentanol, 3-pentanol or 2,2-dimethyl-1-propanol, whether individually or in mixtures.

The concentration of the aliphatic alcohol in water preferably measures from about 25 to about 70% w/w in the procedure of the invention, more preferably from about 40 to about 70% w/w.

The water-insoluble finish is removed using an aqueous solution of at least one aliphatic alcohol with 1 to 5 carbon atoms already at room temperature. The temperature of the aqueous solution of the at least one aliphatic alcohol with 1 to 5 carbon atoms preferably measures from about 20 to about 60° C., more preferably from about 40 to about 60° C. since this shortens the treatment time.

In the procedure of the invention, the aramide fibers provided with a water-insoluble finish can essentially be treated in any manner that ensures that at least one hydrophilic solvent can reach the aramide fibers.

In the procedure of to the invention, the aramide fiber provided with the water-insoluble finish is preferably stirred in at least one hydrophilic solvent, optionally containing a defoamer if required, since this type of treatment is particularly easy to execute, e.g., in a stirred-tank reactor.

Another treatment procedure that is easy to execute, and therefore preferred by the invention, involves treating the aramide fibers in the wash cycle of a washing machine.

Also easy to execute, and hence preferred by the invention, is a treatment procedure in which the aramide fibers are present as a flat textile material, and treated with a water vapor stream.

The weight ratio of aramide fibers to the at least one hydrophilic fluid can be set within broad limits in the procedure of the invention, wherein too much fluid relative to the aramide fibers is to be avoided in order to limit the fluid consumption, and too little fluid relative to the aramide fibers is to be avoided, since the water-insoluble finish will then not be removed sufficiently or quickly enough. The weight ratio of aramide fibers to the at least one hydrophilic fluid preferably measures from about 1:14 to about 1:1 in the procedure of the invention, more preferably from about 1:14 to about 1:6.

In the procedure of the invention, foaming takes place in some combinations of water-insoluble finish, hydrophilic fluid and temperature. If foaming becomes disruptive, the agent used to treat the aramide fibers can contain a defoamer in the procedure of the invention. The defoamer accelerates the removal of the water-insoluble finish in the procedure of the invention to a small degree without measurably influencing the properties of the fibers resulting from the procedure of the invention. Basically any known defoamer can be used as the defoamer in the procedure according to the invention. The defoamer is preferably a surfactant or a surfactant-containing composition.

The surfactant-containing composition is preferably a detergent in the procedure according to the invention.

Any defoamer that might be used in the procedure of the invention in the at least one hydrophilic fluid can be used in a wide concentration range, wherein the defoamer in the at least one hydrophilic fluid is present preferably in a concentration of from about 0.01 to about 3% w/w, more preferably from about 0.1 to about 2% w/w, and most preferably a concentration of about 1% w/w.

The result of removing a water-insoluble finish from aramide fibers of the invention is ascertained by determining the swelling value of the aramide fibers as described below:

About 10 g of aramide fibers, present as short-cut, random fibers or flat textile material, are weighted out, submerged in a 1-liter beaker with 600 ml of demineralized water, and stored there at complete rest, i.e., without being stirred, shaken or moved in any other way, for exactly 60 seconds (measured with a stopwatch). Immediately thereafter, the contents of the 1-liter beaker are poured into a net stretched over another 1-liter beaker. The net with the wet aramide fibers is placed in a centrifuge and centrifuged for 120 seconds (measured with a stopwatch) at 2800 revolutions per minute. The aramide fibers are then transferred with tweezers to a 250 ml beaker previously weighed out precisely to within 0.0001 g (weight c), and the beaker with the aramide fibers is then weighed out precisely to within 0.0001 g (weight a). The beaker containing the aramide fibers is placed for 24 hours in a furnace with a temperature of 105° C. ±5° C. The beaker with the dried aramide fibers is then placed in a desiccator and allowed to cool for 30 minutes, after which the beaker with the dried aramide fibers is weighed out to within 0.0001 g (weight b). Weights a, b and c are used to compute the swelling value Q according to the formula:

$$Q = \frac{a-b}{b-c} \times 100(\%)$$

wherein
  a is the weight of the 250 ml beaker with the centrifuged, moist fibers,
  b is the weight of the 250 ml beaker with the dried fibers, and
  c is the weight of the empty 250 ml beaker.

Aramide layers present as a short-cut, random fiber or flat textile material have a swelling value >50%. A swelling value Q of ≦40% serves as a gauge for sufficient removal of the water-insoluble finish.

The aramide fibers stripped of a water-insoluble finish according to the inventive process, which are present as a short-cut, random fiber or flat textile material, can be utilized for another purpose, e.g., as a pulp or admixed with other natural or synthetic fibers, wherein the treated aramide fibers preferably exhibit a swelling value of ≦40%.

In the examples below, the procedure of the invention shall be illustrated further. The starting materials for all examples are random fibers, short-cut fibers >5 mm or fabrics comprised of p-aramide fibers, which are finished with a water-blocking preparation containing Intrasol AFW from the Stockhausen company and SPAN 85 (sorbitantrioleate) from the ICI company. The swelling value of the starting materials measures >50%.

EXAMPLE 1

250 g to 5 kg of the random fibers, short-cut fibers >5 mm or fabric consisting of p-aramide fibers finished with the above preparation are placed in a laundry bag and loaded into a commercially available washing machine. 1% w/w PERSIL® relative to the weight of the p-aramide fibers is introduced to reduce foaming. The random fibers, short-cut fibers >5 mm or fabric comprising p-aramide fibers are then washed with the washing at the boil program, spun and dried. The swelling value measures ≦40%.

EXAMPLE 2

250 g to 5 kg of the random fibers, short-cut fibers >5 mm or fabric comprising p-aramide fibers finished with the above preparation are placed in a laundry bag and loaded into a commercially available washing machine. To reduce foaming, the washing machine is operated with water at a temperature of >60° C. from the beginning of the wash cycle. The temperature is ensured by hooking up the washing machine to a line with water having a temperature of >60° C., instead of to a cold water line. The random fibers, short-cut fibers >5 mm or fabric comprising p-aramide fibers are washed with the washing at the boil program, spun and dried. The water inhibition value measures ≦40%.

EXAMPLE 3

250 g to 5 kg of the random fibers, short-cut fibers >5 mm or fabric comprising p-aramide fibers finished with the above preparation are placed in a stirred-tank reactor having a volume of approx. 40 L. The random fibers, short-cut fibers >5 mm or fabric comprising p-aramide fibers are covered with DMSO at room temperature, and the DMSO is heated to about 80° C. The DMSO is then removed, and the process of DMSO covering, heating to about 80° C. and DMSO removal is repeated another 4 times. The random fibers, short-cut fibers >5 mm or fabric comprising p-aramide fibers are then thoroughly rinsed with water, wrung out and dried. The swelling value measures ≦40%.

EXAMPLE 4

Example 3 is repeated, except that a DMSO/water mixture is used instead of pure DMSO, wherein the concentration of DMSO in water ranges from about 30 to 100% w/w. The swelling value measures ≦40%.

EXAMPLE 5

Example 3 is repeated, except that an χ-butyrolactone/water mixture is used instead of pure DMSO, wherein the concentration of χ-butyrolactone in water ranges from about 30 to about 100% w/w. The swelling value measures≦40%.

EXAMPLE 6

Example 3 is repeated, except that an ethanol/water mixture is used instead of pure DMSO, wherein the concentration of ethanol in water ranges from about 25 to about 70% w/w, and the ethanol/water mixture is heated to a temperature ranging from about 20 to about 60° C. The swelling value measures ≦40%.

What is claimed is:

1. A procedure for removing a cross-linked water-blocking or water-repellant water-insoluble finish from aramide fibers provided with a water-insoluble finish, comprising treating the aramide fibers with an agent that comprises at least one hydrophilic fluid, wherein the aramide fibers are present as a short-cut, random fiber or flat textile material, wherein the treating of the short-cut or random fiber is treating in the wash cycle of a washing machine or stirring, and wherein the treating of the flat textile material is treating in the wash cycle of a washing machine, stirring or treating with a water vapor stream, and wherein the at least one hydrophilic fluid is water, dimethyl sulfoxide, a solution of dimethyl sulfoxide in water, an aliphatic cyclic ester with 2 to 4 alkylene groups or an aliphatic alcohol with 1 to 5 carbon atoms.

2. The procedure according to claim 1, wherein the water-insoluble finish of the aramide fibers is a cross-linked water-blocking finish.

3. The procedure according to claim 1, wherein the water-insoluble finish of the aramide fibers is a water-repellant finish.

4. The procedure according to claim 1, wherein the aramide fibers comprise m- or p-aramide.

5. The procedure according to claim 1, wherein the at least one hydrophilic fluid is water.

6. The procedure according to claim 5, wherein the water has a temperature ranging from about 60 to about 120° C.

7. The procedure according to claim 5, wherein the water has a temperature ranging from about 85 to about 110° C.

8. The procedure according to claim 5, wherein the water has a temperature of about 100° C.

9. The procedure according to claim 1, wherein the at least one hydrophilic fluid is dimethyl sulfoxide or a solution of dimethyl sulfoxide in water.

10. The procedure according to claim 9, wherein a concentration of dimethyl sulfoxide in water is from about 30 to 100% w/w.

11. The procedure according to claim 9, wherein a concentration of dimethyl sulfoxide in water is from about 70 to 100% w/w.

12. The procedure according to claim 9, wherein a temperature of the dimethyl sulfoxide or its aqueous solution is from about 20 to about 140° C.

13. The procedure according to claim 9, wherein a temperature of the dimethyl sulfoxide or its aqueous solution is from about 70 to about 110° C.

14. The procedure according to claim 1, wherein the at least one hydrophilic fluid is an aqueous solution of an aliphatic cyclic ester with 2 to 4 alkylene groups.

15. The procedure according to claim 14, wherein the aliphatic cyclic ester is χ-butyrolactone.

16. The procedure according to claim 14, wherein a concentration of the aliphatic cyclic ester in water is from about 30 to about 80% w/w.

17. The procedure according to claim 14, wherein a concentration of the aliphatic cyclic ester in water is from about 50 to about 70% w/w.

18. The procedure according to claim 14, wherein a temperature of the aqueous solution of the aliphatic cyclic ester is from about 20 to about 90° C.

19. The procedure according to claim 14, wherein a temperature of the aqueous solution of the aliphatic cyclic ester is from about 60 to about 90° C.

20. The procedure according to claim 1, wherein the at least one hydrophilic fluid is an aqueous solution of at least one aliphatic alcohol with 1 to 5 carbon atoms.

21. The procedure according to claim 20, wherein the aliphatic alcohol is methanol, ethanol, 1-propanol, isopropyl alcohol, 1-butanol, isobutyl alcohol, 2-butanol, tert-butanol, 1-pentanol, 2-pentanol, 3-pentanol or 2,2-dimethyl-1-propanol, individually or in combination.

22. The procedure according to claim 20, wherein a concentration of the aliphatic alcohol in water is from about 25 to about 70% w/w.

23. The procedure according to claim 20, wherein a concentration of the aliphatic alcohol in water is from about 40 to about 70% w/w.

24. The procedure according to claim 20, wherein a temperature of the aqueous solution of the aliphatic alcohol is from about 20 to about 600° C.

25. The procedure according to claim 20, wherein a temperature of the aqueous solution of the aliphatic alcohol is from about 40 to about 600° C.

26. The procedure according to claim 1, wherein the treating comprises stirring the aramide fibers in at least one hydrophilic solvent that optionally contains a defoamer.

27. The procedure according to claim 1, wherein a weight ratio of the aramide fibers to the at least one hydrophilic fluid is from about 1:14 to about 1:1.

28. The procedure according to claim 27, wherein the weight ratio of the aramide fibers to the at least one hydrophilic fluid is from about 1:14 to about 1:6.

29. The procedure according to claim 1, wherein the agent further contains a defoamer.

30. The procedure according to claim 29, wherein the defoamer is a surfactant or a surfactant-containing composition.

31. The procedure according to claim 30, wherein the surfactant-containing composition is a detergent.

32. The procedure according to claim 29, wherein the defoamer in the at least one hydrophilic fluid is present in a concentration of from about 0.01 to about 3% w/w.

33. The procedure according to claim 29, wherein the defoamer in the at least one hydrophilic fluid is present in a concentration of from about 0.1 to about 2% w/w.

34. The procedure according to claim 29, wherein the defoamer in the at least one hydrophilic fluid is present in a concentration of about 1% w/w.

35. A process for forming a material, comprising removing a cross-linked water-blocking or water-repellant water-insoluble finish from aramide fibers in accordance with the procedure of claim 1 to derive treated aramide fibers, and subsequently forming the treated aramide fibers into pulp or into a mixture with other fibers of synthetic or natural origin.

36. The process according to claim 35, wherein the treated aramide fibers have a swelling value of $\leq 40\%$.

* * * * *